United States Patent [19]

Heyne et al.

[11] 4,038,589

[45] July 26, 1977

[54] CONTROLLED POST-SYNCHRONIZING ON BRUSHLESS SYNCHRONOUS MOTORS

[75] Inventors: Carl J. Heyne, Allison Park; Richard Cooper, Jr., Monroeville; Gurney L. Godwin, Pittsburgh, all of Pa.

[73] Assignee: Westinghouse Electric Corporation, Pittsburgh, Pa.

[21] Appl. No.: 634,002

[22] Filed: Nov. 20, 1975

[51] Int. Cl.[2] .............................................. H02P 1/50
[52] U.S. Cl. .................................. 318/174; 318/176; 318/181; 318/183; 318/193
[58] Field of Search ............... 318/167, 174, 176, 181, 318/183, 193

[56] References Cited

U.S. PATENT DOCUMENTS

| 3,350,613 | 10/1967 | Brockman et al. | 318/193 X |
| 3,381,195 | 4/1968 | Hoffmann | 318/193 X |
| 3,405,338 | 10/1968 | Frola | 318/193 X |
| 3,414,788 | 12/1968 | Hoffmann et al. | 318/193 X |
| 3,539,890 | 11/1970 | Zechlin | 318/193 |
| 3,599,236 | 8/1971 | Hutchins | 318/176 |

Primary Examiner—Gene Z. Rubinson
Attorney, Agent, or Firm—G. H. Telfer

[57] ABSTRACT

A static control system for applying excitation to synchronous motors, especially of the brushless type, by firing a semiconductor switch to apply direct current excitation to the field of the motor. A post-synchronization firing circuit is provided for firing the switch in response to the voltage across the switch if the motor pulls into synchronism before the switch is fired. A control circuit is provided for inhibiting the operation of the post-synchronizing firing circuit during subsynchronous operation.

3 Claims, 3 Drawing Figures

CONTROLLED POST-SYNCHRONIZING ON BRUSHLESS SYNCHRONOUS MOTORS

BACKGROUND OF THE INVENTION

1. Field of the Invention

The present invention relates to synchronous motor control and excitation systems, and more particularly to a control system for a brushless exciter which includes a post-synchronizing firing circuit and means for inhibiting the operation of the post-synchronizing firing circuit during subsynchronous operation.

2. Description of the Prior Art

Generally, the excitation system for a synchronous motor includes a field discharge circuit for discharging induced field current during the start-up period and a DC excitation circuit for energizing the motor field winding at synchronous speeds as well as during the predetermined terminal interval of the start-up period to cause the motor to pull into synchronism. The pre-synchronizing application of DC excitation to the field winding is ordinarily necessary to develop the pull-in torque required to synchronize the motor. Just before or after synchronization, a field discharge circuit must be opened or removed from operation so as to avoid current drain from the DC excitation circuit. For greater detail on the theory of synchronization, reference is made to U.S. Pat. No. 3,405,338, "Brushless Synchronous Motor Control System And Circuitry Therefor", issued to F. V. Frola.

It is desirable that the DC excitation be applied at a predetermined point in time or in the slip voltage waveform, or at least a predetermined slip voltage frequency and within a certain phase range of the slip voltage cycle at that frequency. In some applications where the motor is accelerated with zero or light load, the motor can be synchronized without the application of DC excitation during the slip period. Post-synchronizing circuitry then can be employed for applying the DC excitation after synchronization is achieved. Circuitry for this purpose, which includes a post-synchronizing timing capacitor, is disclosed in U.S. Pat. No. 3,381,195, "Excitation Control System For Synchronous Motors", issued to A. H. Hoffmann. Normally, however, DC excitation must be applied during the slip period for synchronism to be achieved.

In the above-mentioned Frola Patent, circuitry is employed for sharply firing a semiconductor exciter switch in the excitation circuit at a predetermined slip voltage frequency and just as the slip voltage is reversing from a positive to a negative polarity. Inherent characteristics of the firing circuit produce the accurately timed firing of the exciter switch. Since the exciter switch is fired just as the slip voltage passes through zero to a negative value, there is some degree of probability that the semiconductor field discharge switch in the field discharge circuit may continue to conduct after the exciter switch is turned on. Some of the current in the excitation circuit is then drained through the field discharge switch and shunted from the motor field winding. Since the magnitude of the drainage current from the excitation circuit can be substantial, it is normally necessary that separate field resistor removal circuitry be employed to open the field discharge switch within a short interval of time.

The need for special field resistor removal circuitry is eliminated through the employment of a circuit which fires the exciter switch after the field discharge switch is open, as described in U.S. Pat. No. 3,414,788, "Excitation Control System For Synchronous Motors", issued to A. H. Hoffmann et al. Synchronism is achieved by firing a gating circuit which provides a sharp signal or pulse in response to the frequency of induced or slip voltage across the field winding, and the exciter switch is closed at substantially predetermined slip voltage frequency and within the best phase range of the slip voltage cycle at that frequency. The particular phase point at which the exciter switch is fired assures prior reversal of polarity across the field discharge switch so that discharge switch is open when DC exciting current starts to flow through the exciter switch to energize the field winding means. Any need for special field resistor removal circuitry is thus eliminated.

Under usual operating conditions of rated stator voltage and low inertia the previous practices have proved to be reliable and satisfactory. However, under conditions of low stator starting voltage, as encountered in shop testing procedures or in installation under weak system conditions, the previous circuitry has allowed the post-synchronizing timing capacitor to charge while the machine was accelerating, sometimes causing application of the field before the machine reaches synchronous speed. This condition causes the starting resistor to remain in parallel across the field of the machine causing overloading of the machine's exciter and semiconductor components with subsequent loss of operation of the motor.

SUMMARY OF THE INVENTION

In accordance with the principles of the present invention, a synchronous dynamoelectric machine control system includes a DC excitation circuit and a circuit for discharging induced field current. A gate operated exciter switch is included in the excitation circuit for controlling application of DC excitation to the field winding. Pre-synchronizing firing circuit means are connected to fire the exciter switch during the start-up period and post-synchronizing firing circuit means are connected to fire the exciter switch within a short time interval and after motor synchronization has been achieved if the motor pulls into synchronism before the pre-synchronizing circuitry is fired. The post-synchronizing firing circuit includes an RC timing circuit and a breakdown diode which respond to a blocking condition of the exciter switch at synchronous speed and fires the exciter switch in a timely manner to enable exciting current to flow in the field winding and thereby maintain the motor at synchronous speed under load.

In order to prevent inadvertent charging of the timing capacitor and the post-synchronizing firing circuit because of low stator starting voltage or long acceleration times, circuit control means are included for inhibiting the operation of the post-synchronizing circuit during subsynchronous operation. The inhibiting circuit is operable to prevent charging of the timing capacitor of the post-synchronizing circuit until the induced voltage in the motor field winding drops below a predetermined value, which value only occurs as the motor nears synchronous operation. Prior to reaching this value, once every slip cycle, the post-synchronizing timing capacitor is discharged, assuring that the post-synchronizing firing circuit may be actuated only after the machine has been synchronized on reluctance torque.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
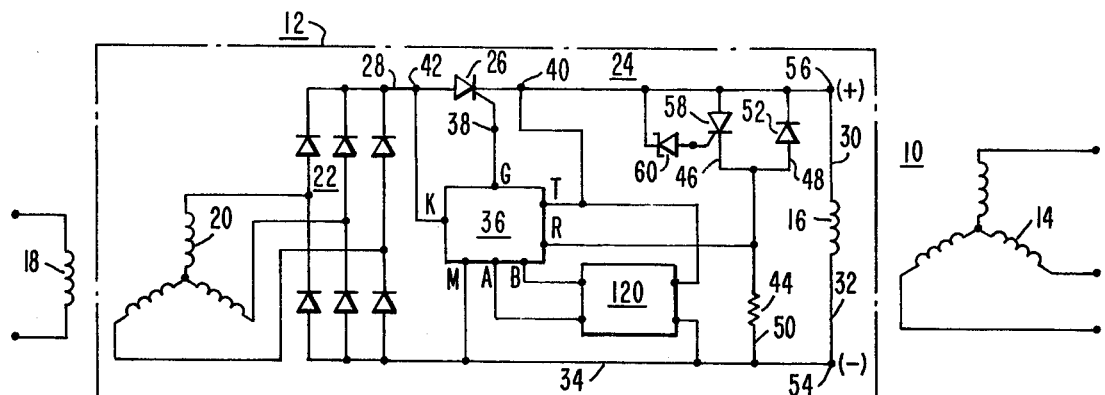
FIG. 1 is a schematic view of a brushless synchronous motor with its control and excitation system arranged in accordance with the principles of the present invention.

Referring now to FIG. 1 of the drawings, there is shown schematically a synchronous motor 10 in combination with a rotating brushless excitation system 12. Although the invention can be embodied to control synchronous motors having brushes and collector rings, it is especially useful in connection with brushless motor systems and the motor 10 is therefore illustrated as a brushless motor. The motor 10 may be any suitable physical construction, and is shown as having a three-phase annular stator winding 14 and a field winding 16 concentrically disposed therein. The stator winding 14 of the motor 10 is suitably energized by three-phase AC source (not shown) and the field winding 16 is energized by direct current from the brushless excitation system 12 in a manner to be described below.

The stator winding 14 produces a rotating magnetic field which interacts with the motor field winding 16 and the usual amortisseur windings (not shown) to produce startup and synchronous torques in the motor 10. The field winding 16 and the amortisseur windings are suitably disposed on a predetermined number of salient rotor poles in the usual manner.

A stationary exciter field winding 18 interacts with a rotating exciter armature winding 20, shown as a three-phase winding, which generates the necessary energy for exciting the motor field winding 16. A rotating bridge rectifier assembly 22 connected to the exciter armature winding 20 supplies excitation current to the field winding 16, thus eliminating the need for brushes and collector rings. A common shaft (now shown) is preferably employed for mechanically connecting the field winding 16 and the exciter armature 20 for concurrent rotation. An excitation control system 24 is connected to control the application of direct current excitation from the rectifier bridge 22 to the field winding 16.

Control of the excitation system is provided by the control system 24 so as normally to assure development of starting torque through induction motor action as well as the final synchronous pull-in torque by timely application of direct current excitation across the field winding 16 through a gated excitation control switch 26 and DC excitation circuit including lines 28, 30, 32, and 34. Thereafter, DC excitation is continously applied to field winding 16 so as to provide the torque necessary to drive the motor load at synchronous speed.

The rectifier arrangement 22 is connected to the exciter armature 20 for the purpose of providing DC excitation for the field winding 16 through the DC excitation circuit. Exciting current is blocked from flowing by the excitation control switch 26, in the form of a silicon control rectifier or other suitable semiconductor switching means, unless a suitable firing circuit means 36 is operated to apply a gating pulse across the gate terminal 38 and cathode terminal 40 of the switch 26 and thereby cause conduction from the anode terminal 42 to the cathode.

During the startup period, the induced voltage in the field winding 16 is discharged by a field resistor 44 in a field discharge circuit 30, 46 or 48 and 50 thereby preventing field winding insulation damage from open circuit induced voltages, and also serving to increase the torque developed by motor 10 during the startup period. The induced field current components of one polarity are carried through the branch 48 and a discharge diode 52 when field winding terminal 54 is positive relative to field winding terminal 56. When the polarity is reversed, a field discharge switch 58, in the form of a silicon control rectifier or other suitable semiconductor switching means, carries the induced field current components of the opposite polarity through the circuit branch 46 once the breakdown voltage of a Zener gate diode 60 is exceeded.

When the motor 10 reaches synchronous speed, there is substantially no induced field voltage in the field discharge circuit because the field winding 16 is then rotating in synchronism with the rotating flux wave produced by the stator winding 14. Further, at synchronism, there is substantially no current in the field discharge resistor 44 since the diode 52 and the field discharge switch 58 normally block any flow of current from the DC excitation circuit.

Preferably, the field discharge switch 58 is normally opened before synchronous speed is reached in the manner described in U.S. Pat. No. 3,414,788 issued to A. H. Hoffmann et al., which is hereby incorporated by reference. In the alternative, the field discharge switch 58 can be opened shortly after synchronization through the use of a semiconductor cutout switch and additional associated circuitry (not shown) in the manner described in the first mentioned U.S. Pat. No. 3,405,338 issued to F. V. Frola, which is hereby incorporated by reference.

The firing control circuit 36 normally fires the exciter switch 26 at a predetermined time in the slip voltage waveform in a manner to be described here only to the extent necessary for the present invention to be understood.

Figure 2:
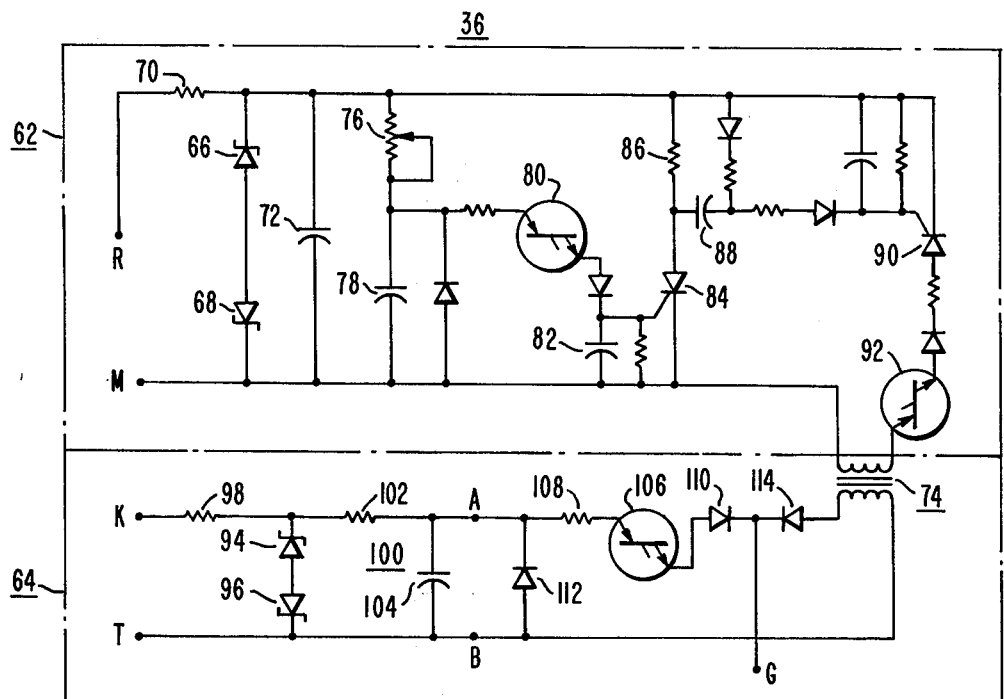
FIG. 2 is a schematic view of an excitation control system which includes a pre-synchronizing excitation circuit and a post-synchronizing excitation circuit.

A preferred embodiment of the firing control circuit 36 is disclosed in FIG. 2 of the drawings. In the description which follows, when the term "positive field or slip" voltage is used, it is meant that the polarity of induced field voltage is such that the field terminal 56 is positive relative to field terminal 54.

Generally, the firing control circuit 36 comprises a pre-synchronizing firing control circuit 62 and a post-synchronizing firing control circuit 64 which operate independently with respect to one another to provide a firing pulse to the gate of the firing control switch 26. The purpose of the pre-synchronizing circuit 62 is to sense the speed of the machine's rotor and apply a firing pulse to the gate terminal 38 of the switch 26 when the correct rotor speed is reached and when the induced field current is passing through the discharge diode 52. The input signal to the pre-synchronizing circuit 62 enters through terminals R and M and is the voltage across the starting resistor 44 during asynchronous operation. The input voltage signal is clipped to a predetermined value by Zener diodes 66, 68. A resistor 70 limits the current flowing through the Zener diodes 66 and 68. This voltage is applied across a capacitor 72 which stores energy for pulsing a pulse transformer 74 at a predetermined slip frequency (for example, 95% synchronous speed) and directly in response to a positive half cycle of the slip voltage waveform at that frequency.

The speed sensing capability of the circuit is provided by the RC combination of a resistor 76 and a capacitor 78. The value of the maximum voltage developed across capacitor 78 is fixed by a Schockley diode 80 for a given setting of the resistor 76, so that the voltage across the capacitor 78 is a function of the time that voltage is supplied to it and therefore is directly proportional to slip frequency. When the voltage across the capacitor 78 reaches a predetermined value, the Schockley diode 80 will fire and discharge through a capacitor 82 which in turn gates a frequency switch 84.

The conduction of the frequency switch 84 causes a voltage to appear across a resistor 86 which charges a capacitor 88. The charge stored in capacitor 88 is applied to the gate of a phase switch 90 when the resistor 86 drops below the value of the voltage across capacitor 88. This provides a gate pulse to the phase switch 90 which allows it to conduct when a positive anode to cathode voltage appears. This positive anode to cathode voltage appears when the terminal M is positive with respect to terminal R and great enough to cause a Schockley diode 92 to conduct. Therefore, when the phase switch 90 is gated, current will flow through the pulse transformer 74 which provides a pulse to the terminal 38 of the excitation control switch 26. The excitation control switch 26 is thus normally fired at a predetermined time point in the slip voltage waveform and the switch firing is dependent primarily on slip voltage frequency and not to any material extent on other system factors. For further details concerning the operation of the pre-synchronizing circuit 62, refer to the above-mentioned U.S. Pat. Nos. 3,405,338 and 3,414,788.

As previously explained, the excitation control switch 26 may remain open at synchronous speed under certain circumstances, particularly when the motor 10 is rapidly accelerated against a zero load. Specifically, the final cycle of slip voltage can have a positive half cycle of inadequate time duration to actuate a fire control circuit 36 and the exciter control switch 26, and it can have a negative half cycle which is of sufficiently long duration to permit the motor to pull into synchronism due to saliency of the rotor poles before another positive half cycle of slip voltage is produced. Under the conditions of rapid motor acceleration, the firing control circuit 36 thus can be non-responsive to the positive field voltage at subsynchronous speeds and the exciter control switch 26 can remain open to withhold the excitation current needed in the field winding 16 for the maintenance of synchronous speed under load.

If the motor 10 pulls into step without field application, the signal to the normal pre-synchronizing circuitry will be zero and the excitation control switch 26 will not be gated. In order to assure that the excitation control switch will be gated if the motor is synchronized on reluctance torque, a post-synchronizing firing circuit is cooperatively combined with the pre-synchronizing firing circuit to fire the excitation control switch 26 if it is not fired prior to the time at which the motor 10 reaches synchronous speed. Although the post-synchronizing firing circuit 64 is shown in combination with the pre-synchronizing firing circuit 62, the post-synchronizing circuit 64 can be employed to produce post-synchronizing DC excitation in other control systems having a DC excitation circuit controlled by an exciter switch such as the excitation control switch 26.

The post-synchronizing firing circuit 64 senses whether exciting current is flowing and particularly whether the excitation control switch 26 is conducting at a point in time after the usually effective firing circuit 62 would fire the excitation control switch 26. As its name implies, however, the post-synchronizing firing circuit 64 preferably senses a state of the excitation control switch 26 after the motor 10 has reached synchronous speed.

For this purpose, the input terminals K and T are connected respectively to the excitation control switch 26, anode terminal 42 and cathode terminal 40. The potential drop across the excitation control switch 26 with its time varying characters is thus determinative of the operation of the firing control circuit 64. This is the voltage which appears across the excitation control switch 26 and is the vector addition of the DC voltage from the rectifier bridge 22 and the induced field voltage of the field winding 16 during starting. The output from the firing circuit 64 is applied to the gate cathode terminals 38 and 40 of the excitation control switch 26 so as to produce a pulse or signal for firing the excitation control switch at the appropriate time.

The post-synchronizing firing circuit 64 comprises Zener diodes 94 and 96 which are connected across the input terminals K and T through a current limiting resistor 98 to produce a clipped voltage waveform across an energy storage timing circuit 100 including a resistor 102 and a timing capacitor 104. When the timing capacitor voltages reaches a sufficiently high value, a Schockley breakdown diode 106 becomes conductive to produce a sharp output pulse through the gate terminal G for firing the excitation control switch 26.

A resistor 108 limits forward current in the breakdown diode 106 and a diode 110 prevents reverse current flow through the breakdown diode 106. A diode 112 is connected across the timing capacitor 104 to bypass the capacitor on negative half cycles of exciter switch anode-to-cathode voltage and thereby assure a zero charge on the capacitor 104 each time the anode-cathode voltage goes positive. A diode 114 prevents reverse current flow through the transformer 74 when the post-synchronizing firing circuit 64 delivers a pulse to the terminal G for actuating the excitation control switch 26. The operation of the post-synchronizing circuit 64 is described in greater detail in U.S. Pat. No. 3,381,195, issued to A. H. Hoffmann, which is hereby incorporated by reference.

During the period of slip, the output voltage from the exciter armature 20 rises in magnitude as motor speed increases. The induced field voltage alternates in polarity with a generally constant peak in magnitude in excess of the magnitude of the exciter armature voltage and the instant decrease in magnitude as the motor can accelerate to synchronous speed.

Since the excitation control switch 26 is in series with the rectified output of the exciter armature 20 and with the field winding 16, the potential drop across the anode and cathode terminals 42 and 40 of the excitation control switch 26 during the slip is the algebraic sum of the DC excitation voltage and the induced AC field voltage. Accordingly, the potential drop from the anode terminal 42 to the cathode terminal 40 fluctuates from a relatively high positive peak value to a lower positive minimum value or a negative peak value of lower absolute magnitude with decreasing frequency as the motor 10 accelerates to synchronous speed.

Under normal operating conditions of rated stator voltage and low inertia, the pre-synchronizing circuit 62 and post-synchronizing circuit 64 have proved to be entirely satisfactory. However, under conditions of low stator starting voltage, as encountered for example in shop testing or installation under weak system conditions, the potential drop across the anode and cathode terminals 42 and 40 of the excitation control switch 26 remains sufficiently small or negative thereby causing the post-synchronizing timing capacitor 104 to charge during subsynchronous operation, and causing application of field excitation before the machine reaches synchronous speed. This condition causes the starting discharge resistor 44 to remain in parallel across the field winding 16 causing overloading of the machine exciter semiconductor components.

Figure 3:
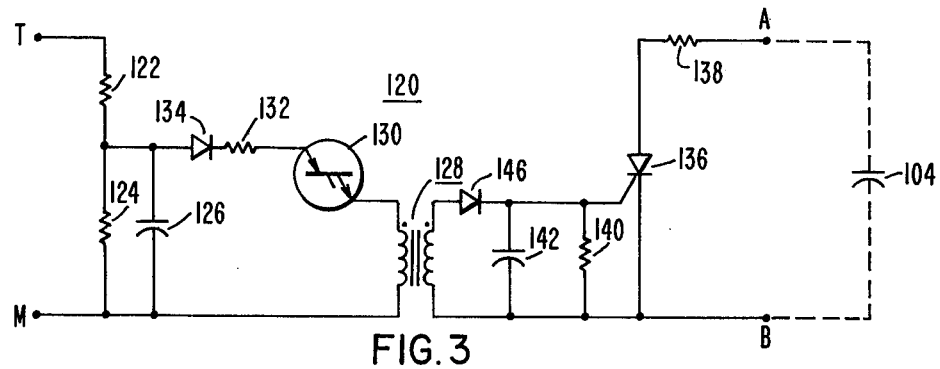
FIG. 3 is a schematic view of a control circuit for inhibiting the operation of the post-synchronizing excitation circuit of FIG. 2.

In accordance with the principles of the present invention, a control circuit 120 as shown in FIG. 3 is provided for inhibiting the operation of the post-synchronizing firing circuit 64 during subsynchronous operation. The purpose of the inhibiting circuit 20 is to prevent charging of the timing capacitor 104 in the post-synchronizing firing circuit 64 until the induced voltage in the motor field winding 16 drops below a predetermined value which indicates that the motor is nearing synchronous speed. In this way, premature application of field current is prevented, and the field discharge switch 58 which controls current flow to the starting resistor 44 has ample time to reach a current zero and become an open circuit.

The input to the inhibiting circuit 120 is the voltage across the terminals T and M, which is the voltage developed across the field winding 16. Resistors 122 and 124 form a voltage divider to step-down the signal appearing across the terminals T and M to a predetermined value. A capacitor 126 stores energy for delivering a pulse through an isolation transformer 128. The breakdown diode 130 conducts when the voltage across the capacitor 126 reaches a predetermined value and conducts a sharp pulse to the transformer 128. A resistor 132 is connected in series with the breakdown diode 130 to limit the current passing through it to a safe value. Also, a diode 134 protects the breakdown diode 130 from harmful reverse currents. The transformer 128 in turn supplies a pulse to the gate circuit of a switch 136 which discharges the timing capacitor 104 of the post-synchronizing circuit 64. A resistor 138 limits the discharge current value. A resistor 140 and a capacitor 142 in cooperation with a diode 146 protect the gate circuit of the switch 136.

In operation, the inhibiting circuit 120 senses the voltage appearing across the terminals T and M. When this voltage approaches the breakdown value of the Zener diode 60 (as shown in FIG. 1) the capacitor 126 of the inhibiting circuit 120 charges to a value of voltage sufficient to cause a breakdown diode 130 to conduct. When the breakdown diode 130 conducts, the capacitor 126 delivers its stored charge into the transformer 128. The transformer 128 transfers this pulse to the gate of the switch 136 causing it to conduct current and to discharge the capacitor 104 which is the timing capacitor 104 of the post-synchronizing firing circuit 64. This new circuit prevents the post-synchronizing timing capacitor from charging as long as the motor is accelerating or as long as the machine rotor is swinging rapidly enough to trigger the field discharge switch 58. Because of this cooperation between the inhibiting circuit 120 and the post-synchronizing circuit 64, the excitation control switch 26 is prevented from operating at a time when the field discharge switch 58 is conducting, therefore, the starting resistor 44 will not remain in parallel with the field winding 16 during synchronous operation. Therefore, once every slip cycle, the post-synchronizing timing capacitor 104 will be discharged, assuring that the post-synchronizing timing will start only after the motor has been synchronized by reluctance torque.

The foregoing description has been presented only to illustrate the principles of the invention. Accordingly, it is desired that the invention be not limited by the embodiment described, but, rather that it be accorded an interpretation consistent with the scope and spirit of its principles.

We claim as our invention:

1. A synchronous dynamoelectric machine comprising: a rotary field winding, an alternating current exciter armature rotatable with said field winding, rectifier means connected to said exciter armature to supply direct current excitation to said field winding, a discharge circuit including a resistor and field discharge switching means connected across said field winding for discharging current induced in said field winding during subsynchronous operation, an exciter switch connected in an excitation circuit between said rectifier means and said field winding for applying direct current excitation from said rectifier means to said field winding, and an excitation control system operably connected to control the actuation of said exciter switch, said excitation control system comprising a pre-synchronizing circuit responsive to the slip frequency of voltage induced in said field winding for actuating said exciter switch to conduct synchronizing excitation current to said field winding substantially at a predetermined slip voltage frequency, a post-synchronizing firing circuit responsive to a voltage of predetermined magnitude and polarity impressed across said exciter switch for actuating said exciter switch upon the condition that said field winding is synchronized before said exciter switch is actuated by said pre-synchronizing circuit, and circuit means for inhibiting the operation of said post-synchronizing circuit during subsynchronous operation, said inhibiting circuit means being responsive to a voltage of predetermined magnitude and polarity developed across said field winding for preventing actuation of said exciter switch by said post-synchronizing firing circuit during subsynchronous operation, and said post-synchronizing circuit including a timing circuit having a resistor and a capacitor connected to be energized by the voltage appearing across the anode-cathode terminals of said exciter switch, means responsive to said timing circuit for providing a firing signal when the voltage of said post-synchronizing timing circuit capacitor exceeds a predetermined value of predetermined polarity, and means operably connected thereto for applying said firing signal to a gate terminal of said exciter switch, said inhibiting circuit including means responsive to said voltage appearing across said field winding being connected to provide an inhibiting signal when said field winding voltage exceeds a predetermined value, and discharge means responsive to said inhibiting signal connected to discharge said post-synchronizing timing capacitor during each slip cycle of subsynchronous operation.

2. The combination as defined by claim 1 wherein said inhibiting signal means comprises a firing circuit responsive to the output of an R-C timing circuit, and said discharge means comprises a gate-controlled discharge switch, said timing circuit being operable to trigger a firing pulse from said firing circuit during each cycle of subsynchronous operation, the gate of said discharge switch being connected to receive said firing pulse and actuate said discharge switch, the anode and cathode of said discharge switch being connected in parallel across said post-synchronizing timing capacitor to provide, when actuated, a low-resistance discharge path for current stored therein.

3. The combination as defined by claim 1, said field discharge circuit comprising said field discharge switching means being connected in series electrical relation with said field discharge resistor, said series combination of said field discharge switching means and field discharge resistor being connected in parallel electrical relation with said field winding, and the input of said inhibiting circuit being connected in parallel electrical relation with said parallel combination of said field winding and said discharge circuit for sensing the voltage developed across said field winding.

* * * * *